United States Patent [19]
Behrmann et al.

[11] Patent Number: 5,598,494
[45] Date of Patent: Jan. 28, 1997

[54] MULTI-CHANNEL FIBER OPTIC CONNECTOR

[75] Inventors: Greg Behrmann, Columbia; Dale Smith, Baltimore, both of Md.; Greg Ronan, Palo Alto, Calif.

[73] Assignee: The United States of America as represented by the Secretary of the Army, Washington, D.C.

[21] Appl. No.: 546,879

[22] Filed: Oct. 23, 1995

[51] Int. Cl.⁶ ............................. G02B 6/00; G02B 6/38
[52] U.S. Cl. .............................................................. 385/59
[58] Field of Search ................................ 385/53, 56, 58, 385/59, 147

[56] References Cited

U.S. PATENT DOCUMENTS

| | | |
|---|---|---|
| 4,657,338 | 4/1987 | Khoe et al. ........................ 385/59 |
| 5,315,678 | 5/1994 | Maekawa et al. ................. 385/59 |
| 5,339,376 | 8/1994 | Kakii et al. ..................... 385/59 X |
| 5,379,360 | 1/1995 | Ota et al. ......................... 385/59 |
| 5,416,868 | 5/1995 | Kakii et al. ..................... 385/59 X |
| 5,519,798 | 5/1996 | Shahid et al. .................. 385/59 X |

*Primary Examiner*—Akm E. Ullah
*Attorney, Agent, or Firm*—Freda L. Krosnick; Frank J. Dynda

[57] ABSTRACT

A device and method for efficiently and repeatably optically aligning multimode optical fibers. Silicon V-grooves are used to position each fiber in a linear array. The fibers make up two arrays which are separable for repairs and upgrades. The alignment mechanism features a kinematic mounting using a metal balls. The device and method advantageously aligns fiber arrays of varying sizes.

14 Claims, 4 Drawing Sheets

MULTI-CHANNEL FIBER OPTIC CONNECTOR

FIELD OF INVENTION

This invention is directed to connectors for joining optical fibers. When it is desired to transfer light travelling in one optical fiber into another optical fiber, a connector must be used. Connectors serve to align the fibers provide a smooth and continuous path for light transfer, and permit a separable joint.

BACKGROUND OF THE INVENTION

There are several multi-channel connectors used in the art at present. One, utilizes guide rods to align two connector halves together. The device has V-grooves which house individual fibers, and larger V-grooves which house the guide rods. The fiber system of this device has arrays up to eighteen fibers. The connector device, utilizes connecting fibers of equal size. Lastly, alignment of the two fiber arrays cannot be maximized once the guide grooves and fiber grooves are etched or molded. It is the object of our invention to overcome the problems associated with prior art devices, discussed hereinabove.

SUMMARY

It is, therefore, an object of our invention to provide a connector device that allows light transfer from an originating fiber to a specific transfer fiber, thereby allowing the user to monitor specific originating fibers.

It is another object of our invention to provide a connector device that couples fibers of different sizes, that can array with multiple fibers and incorporates silicon V-grooves.

It is another object of our invention to provide a connector device that uses a three-point ball bearing scheme to allow precise realignment of connector halves regardless of the number of times the device is connected or disconnected.

It is still another object of our invention to provide a connector device having small epoxy bond lines that prevent movement of the arrays and consequently misalignment, during epoxy cure.

It is still another object of our invention to provide a connector device that incorporates monocoil cables and strain reliefs to protect fibers from damage.

DRAWINGS

DETAILED DESCRIPTION OF THE PREFERRED EMBODIMENTS

Figure 1:
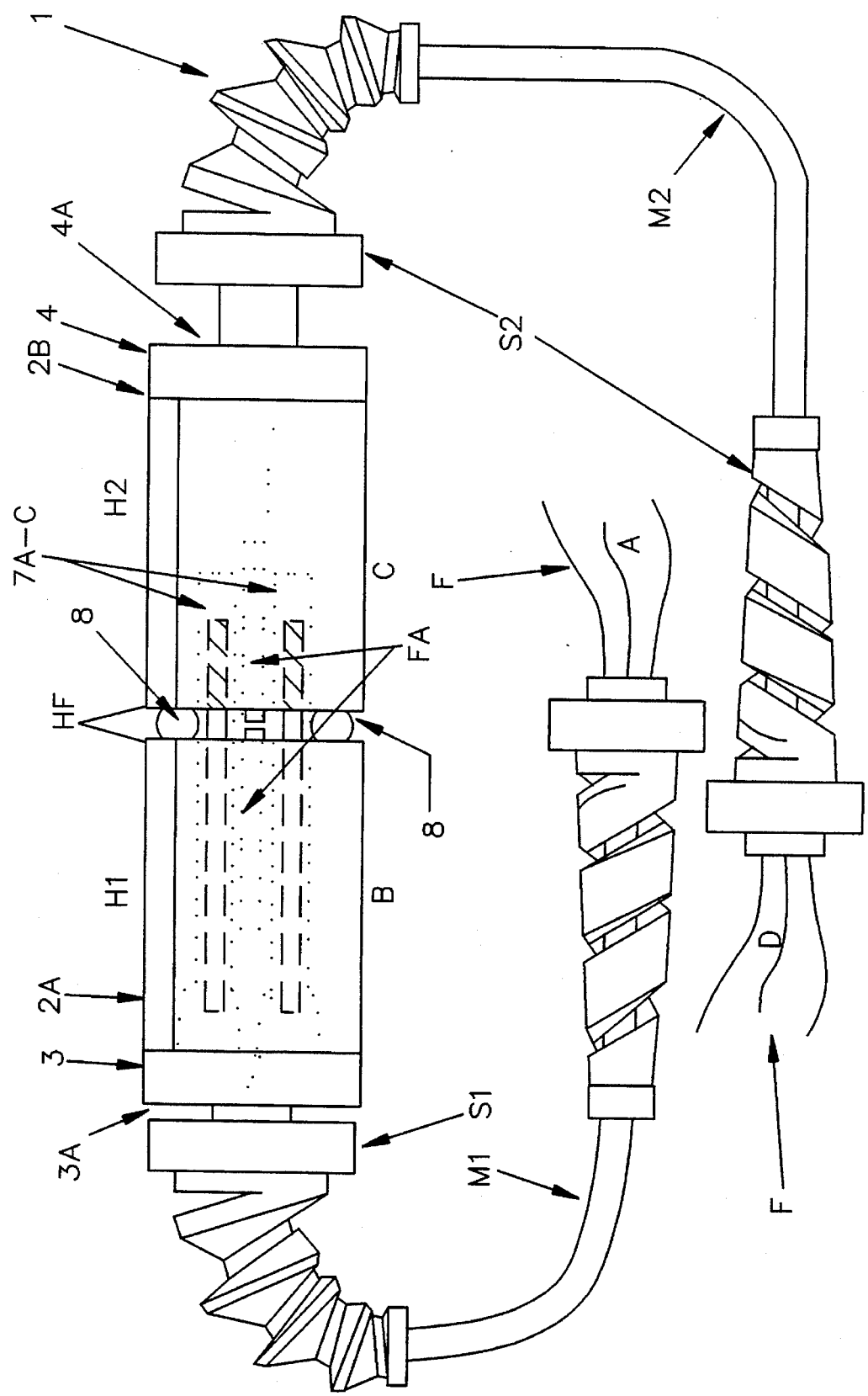
FIG. 1 shows the multi-channel fiber optic connector device.

As shown in FIG. 1, multi-channel fiber optic connector device 1 has first and second connector halves $h_1$ and $h_2$, each of the halves having a back end portion 2a and 2b, respectively attaching strain relief rings 3 and 4. Each of strain relief rings 3 and 4, also has a central aperture 3a and 4a. Fibers F travel through strain reliefs $S_1$ and $S_2$ and through rings 3 and 4. Rings 3 and 4 are further designed to cover the heads of screws of strain reliefs $S_1$ and $S_2$.

Figure 2:
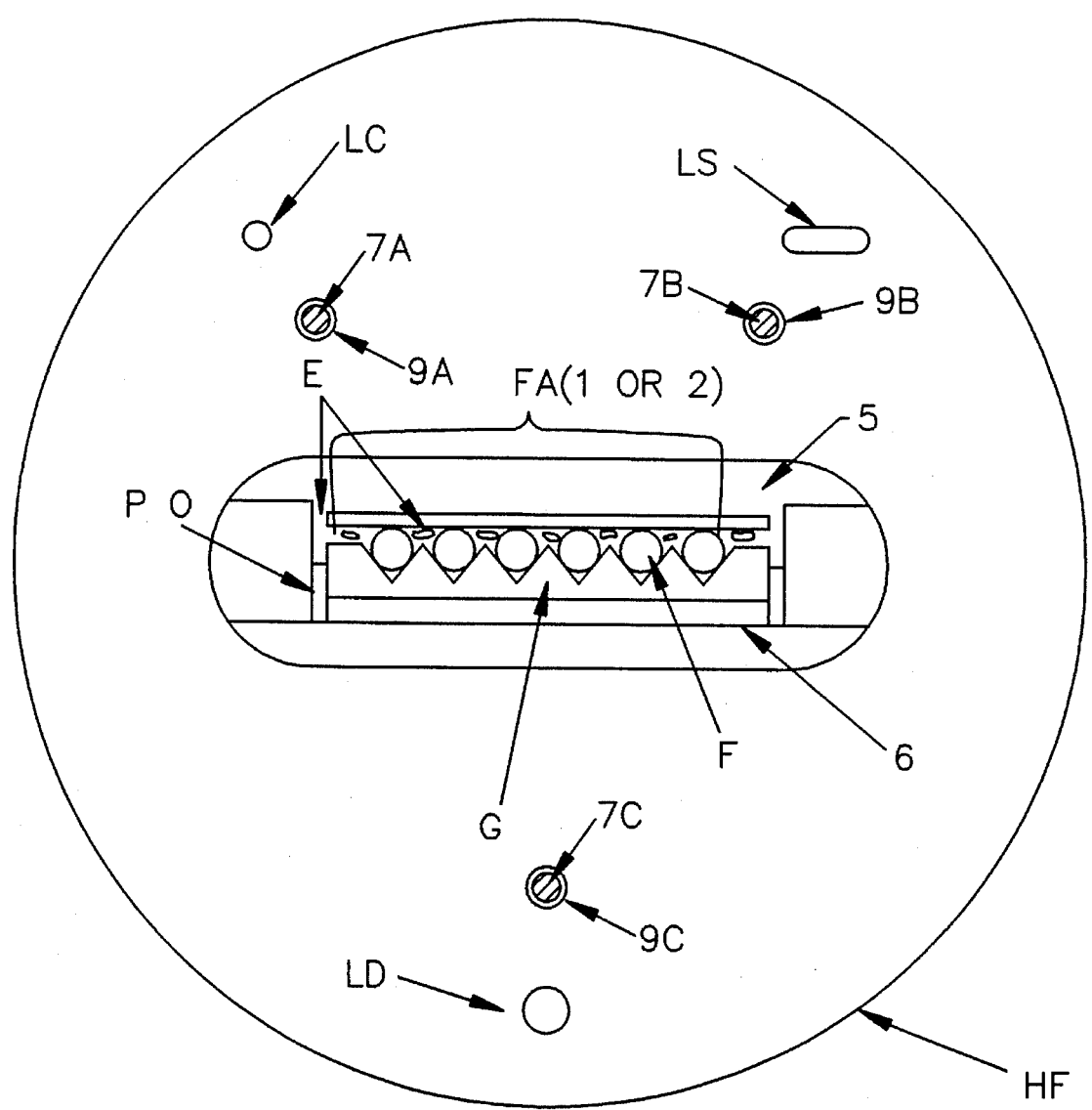
FIG. 2 shows the front face of the connector device.
Figure 3A:
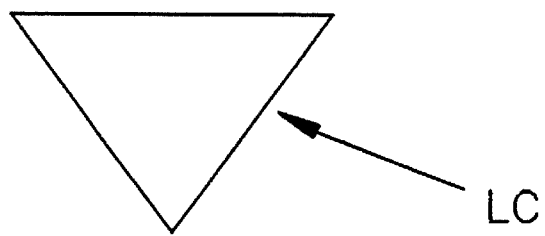
FIGS. 3a–3c show side views of embodiments of the locator.
Figure 3B:
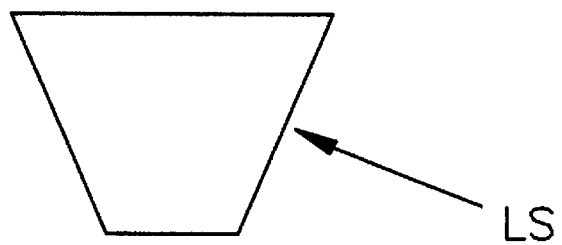
Figure 3C:
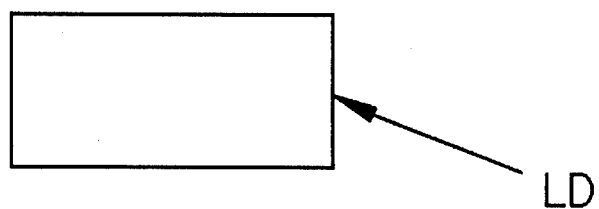
Figure 4:
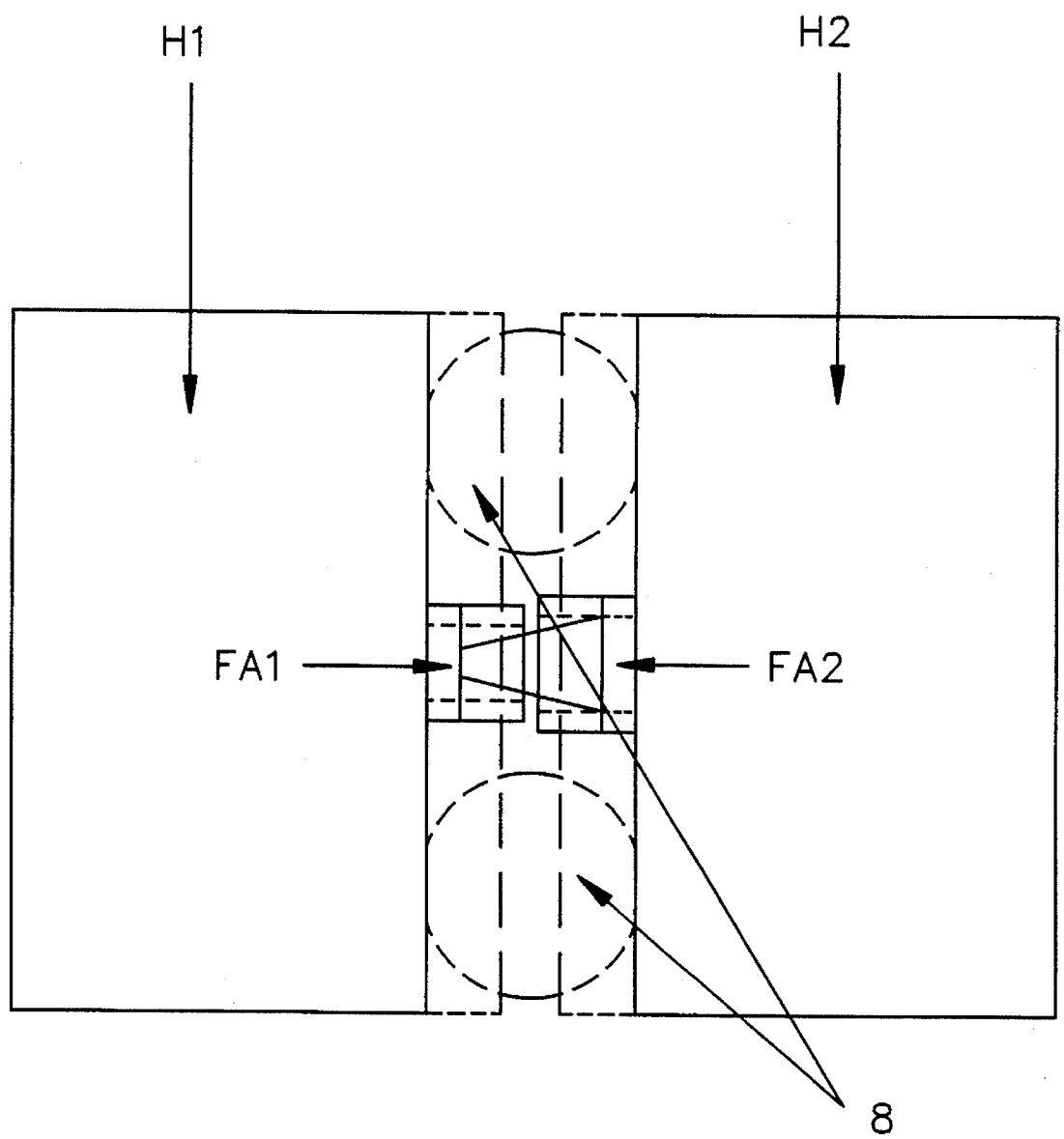
FIG. 4 shows an enlarged side view of the connector device.

The front face $h_f$ of first and second connector halves $h_1$ and $h_2$, respectively are shown in FIG. 2. A slot locator $L_s$, a cone locator $L_c$ and a disk locator $L_d$, as shown in FIGS. 3a–c are positioned on connector device 1 as shown in FIG. 2. Fibers F are composed of a first and second fiber array $F_{a1}$ and $F_{a2}$, such as a six element array. Silicon etched grooves G are sandwiched between glass pieces* 5 and 6, with fiber array $F_{a1}$ and $F_{a2}$ laid in grooves G. FIG. 4 is an embodiment of the invention showing an enlargement of fiber arrays $F_{a1}$ and $F_{a2}$, where $F_{a1}$ is made up of small fibers and $F_{a2}$ is made up of large fibers, with light is being transferred from $F_{a1}$ to $F_{a2}$.

*Note: Glass is provided for strength (to protect against chipping of the brittle silicon), but is not necessary for proper operation of connector.

Connector device 1 allows light transfer from an originating fiber to a specific transfer fiber, and thus allows the user to monitor specific originating fibers. Connector device 1 also couples fibers of different sizes that can array with multiple fibers.

A first array of fibers $F_{a1}$ fibers F originate at some point of interest generally labelled point A (see FIG. 1). Fibers F extend through strain relief $S_1$ and are positioned in first connector half $h_1$, generally labelled point B. At point B, fibers F are laid in grooves G as shown in FIG. 2.

Grooves G are a linear array of v shaped** grooves etched in silicon. Grooves G are defined by a photolithographic process and are formed by an anisotropic etch. One of fibers F is laid in each of grooves G. When monitoring of the fibers is required, each of fibers F may be assigned a specific groove of grooves G. The method involved in etching grooves G may vary depending upon the number and size of fibers F.

**Grooves are generally trapezoided in shape ⎺\\_/⎺. When further etched, the trapezoid becomes v shaped ⎺\\/⎺. For proper positioning of the fibers, it is only necessary for the fibers to touch the slanted side walls ⎺⊙⎺ or ⎺⊽⎺. The bottom surface must not touch the fibers.

Second connector half $h_2$, houses another array of fibers F, generally labelled point C. The fibers F positioned at a point C of second connector half $h_2$, can be of the same size, smaller or larger than those of first connector half $h_1$. Similarly, fibers F of second connector half $h_2$ are also positioned in grooves G as described above. The fibers F of second connector half $h_2$ extend through strain relief $S_2$ and terminate at a point D, as shown in FIG. 1. Fibers F at point A could form an incoherent bundle of fibers, a coherent or incoherent array of fibers, be part of another connector, be pigtailed into separate photodetectors, or be pigtailed to separate light sources such as lasers or LEDs.

Fiber array $F_{a1}$, at point B, is housed in first connector half $h_1$. Once fibers F are arbitrarily positioned, epoxy E is introduced in the small space between grooves G and the sides of $h_1$. A very small quantity of epoxy E is used to secure grooves G to $h_1$. Drops of low viscosity, low shrinkage, low thermal expansion epoxy was used. Epoxy E was allowed to fill space P via capillary action. This method ensures that fibers F won't move while epoxy E shrinks during cure. Fibers F are epoxied in place in sides of second connector half $h_2$, in the same manner as first connector half $h_1$, as explained hereinabove. Since the bond line of epoxy E is directly proportional to the linear shrinkage of epoxy E, and to ensure a small bond line, first and second connector halves $h_1$ and $h_2$ were designed to have a 0.005 inch clearance between grooves G and the sides of first and second connector halves $h_1$ $h_2$.

As shown in FIG. 2, after positioning and securing fibers F in first and second connector halves, $h_1$ and $h_2$, second connector half $h_2$ is secured to first connector half $h_1$ via screws 7a–7c. First and second connector halves, $h_1$ and $h_2$ are aligned using the following three-point system. Three spherical ball bearings 8 (two are shown in FIG. 1) are permanently affixed to one of first and second connector halves $h_1$ or $h_2$. The other of first and second connector halves $h_1$ or $h_2$, has three receptacles $L_C$, $L_S$ and $L_D$ that align with balls 8 and matingly connect connector halves $h_1$ and $h_2$. First receptacle or cone locator Lo is configured in a conical cross-sectional configuration as shown in FIG. 3a. When spherical ball bearing 8 is seated in first receptacle $L_C$, it is limited to rotating motion, similar to a ball and socket. Second receptacle or slot locator $L_S$, is an extended conical shape as shown in FIG. 3b. Slot locator $L_S$ only restrains rotation of bearing 8 to that permitted by first receptacle $L_C$. This allows the mating system to be kinematically arranged to permit repeatable mating and demating. Third receptacle or disk locator $L_D$, does not restrain any motion of ball bearing 8, but is used to eliminate tilt between first and second connector halves, $h_1$ and $h_2$.

Screws 7a, 7b and 7c, which are used to hold first and second connector halves $h_1$ and $h_2$ together, are positioned in screw holes 9a, 9b and 9c, respectively. As shown in FIG. 2, screw holes 9a, 9b and 9c are positioned within a triangle formed by cone locator $L_C$ slot locator $L_S$, and disk locator $L_D$. This particular configuration assures that a positive seating force is applied to ball bearings 8 in their respective receptacles.

In operation, a top cover $T_2$ of second connector half $h_2$ is removed and fibers F at point C is lowered into position. Fibers F is attached to a six degree-of-freedom stage (ie, three translations, three tilts) that allows fibers F to be positioned through six axes. To align fibers F of both first and second connector halves $h_1$ and $h_2$, light is allowed to emerge from fibers F at point B. A detector (not shown), at point D, measures how much light is transferred from fibers F at point B to fibers F at point C until the transfer of light is maximized for all of the fibers F. At this point, fibers F at point C is epoxied in place by the method described, above. Pursuant to epoxy cure, first and second connector halves $h_1$ and $h_2$ may be disconnected and reconnected many times without loss of alignment.

Once first and second connector halves, $h_1$ and $h_2$ are fabricated, they are considered master first and second connector halves $Mh_1$ and $Mh_2$, as will be explained hereinbelow. Any other halves that are consequently fabricated are aligned to their respective master halves. For example, when first master connector half $Mh_1$ houses small fibers and $Mh_2$ houses large fibers, any connector half that houses small fibers will be aligned to second master half $Mh_2$. Any connector half that houses large fibers will be aligned to first master connector half $Mh_1$. This process allows any connector half that houses large fibers to be connected to any connector half that houses small fibers. This process also allows compatibility between connector halves, as they are interchangeable. Once in place, fibers F within their respective first and second connector halves $h_1$ and $h_2$, are fixed in position (placed in the silicon V-grooves G and by the epoxying process identified above). Fibers F located outside of the first and second connector halves $h_1$ and $h_2$, are free to move.

A strain relief system prevents fibers F from being pulled, bent beyond the breaking point, or from being crushed. As shown in FIG. 1, fibers F are housed in first and second monocoil cables $M_1$ and $M_2$. Cables $M_1$ and $M_2$, are spring-like and made of flat metal, such as steel bent into a helical spiral and surrounded by a polyvinyl chloride (PVC)sheath. Since cables $M_1$ and $M_2$ are spring-like, they resist pulling. In addition, due to the metal being wound, cables $M_1$ and $M_2$ resist crushing and cannot be bent past the bending point of fibers F. Thus fibers F are protected between points A & B and C & D. Monocoil cables $M_1$ and $M_2$, terminate into strain relief $S_1$ and $S_2$, respectively, as shown in FIG. 1. Strain reliefs $S_1$ and $S_2$ may be those manufactured by Heyco Molded Products, Inc. Strain reliefs $S_1$ and $S_2$ become restrictive as they approach a fiber termination point, such as first and second connector halves $h_1$ or $h_2$. This method allows for gradual restriction of fibers F as they become fully restricted in first and second connector halves $h_1$ or $h_2$, and relieves strain in the fibers F.

What is claimed is:

1. A multi-channel fiber optic connector device comprising:
  (a) first and second connector halves, each of said connector halves comprising a back end portion;
  (b) first and second strain relief rings;
  (c) first and second strain reliefs;
  (d) a plurality of optical fibers;
  said first and second strain relief rings being connected to said first and second connector at said back end portion, respectively;
  each of said strain relief rings further comprising a central aperture, said central aperture constructed so as to comprise a threading, said each of said first and second reliefs being screwed into said apertures, respectively;
  said plurality of optic fibers constructed so as to be positioned through each of said reliefs and each of said rings;
  said rings further comprising a cover, said cover constructed so as to blanket heads of screws positioned within said first and second connector halves.

2. A multi-channel fiber optic connector device as recited in claim 1 further comprising, said first and second connector halves each having front face, a cone locator, slot locator and a disk locator positioned on each of said front face.

3. A multi-channel fiber optic connector device as recited in claim 2 further comprising silicon etched grooves said grooves sandwiched between a first and second glass piece, said grooves positioned in said each of said front face.

4. A multi-channel fiber optic connector device as recited in claim 3, and further comprising said plurality of fibers positioned said grooves such that one of said plurality of fibers is laid in each of said grooves.

5. A multi-channel fiber optic connector device as recited in claim 4, and further comprising securing said each of said grooves in said first and second connector halves with epoxy such that a 0.005 inch clearance between each of said grooves and sides of said first and second connector halves is maintained.

6. A multi-channel fiber optic connector device as recited in claim 5, and further comprising positioning three ball bearings on said front face of said first connector half.

7. A multi-channel fiber optic connector device as recited in claim 6, and further comprising receptacles positioned on said front face of said second connector half, such that one of said ball bearings aligns with one of said receptacles, said receptacles further comprising said cone locator, said slot locator and said disk locator and securing said first and second connector halves with said screws.

8. A multi-channel fiber optic connector device as recited in claim 7, and further comprising a first and second fiber array of said fibers wherein, said first and second fiber arrays are constructed so as to align and transfer light through said first and second connector halves.

9. A multi-channel fiber optic connector device as recited in claim 8, wherein said first and second fiber arrays comprise said fibers of varying size and shape.

10. A strain relief system comprising:
(a) first and second connector halves each of said connector halves comprising a front face and a back end portion;
(b) a first and second strain relief ring, each of said ring connected to said back end portion of said first and second connector halves, respectively;
(c) a first and second strain relief, each of said strain relief connected to said first and second strain relief ring, respectively;
(d) a plurality of optical fibers, said fibers positioned through each of said strain reliefs, each of said strain relief rings, said fibers terminating in said front face of each of said first and second connector halves;
(e) a first and second monocoils each of said monocoils constructed so as to sheath said plurality of optical fibers, and further constructed so as to prevent said plurality of fibers from being pulled and bent beyond a breaking point of said fibers, said monocoils further constructed so as to prevent said fibers from being crushed.

11. A strain relief system as recited in claim 10, said first and second monocoil further comprising a helical spiral, flat metal spring cable, said cable further constructed so as to be surrounded by a polyvinyl chloride sheath.

12. A method of forming a multichannel fiber optic connector comprising:

(a) providing first and second connector halves, each having a strain relief and a ring and providing a fiber array through said each half;
(b) matingly connecting said first half to said second half of step (a) such that said fiber array of said first half aligns with fiber array of said second half;
(c) transferring light from said fiber array of said first half to said fiber array of said second half.

13. A method of forming multichannel fiber optic connector as recited in claim 12 and further comprising aligning said fiber arrays comprising fibers of different sizes.

14. A method of forming multichannel fiber optic connector as recited in claim 13 and further comprising:
(a) positioning said fibers in grooves housed in said first and second halves such that a fiber of said fibers is positioned is a groove of said grooves;
(b) introducing epoxy in a space formed between said grooves and sides of said connector halves;
(c) filling said space with epoxy by capillary action;
(d) positioning said grooves in said first and second halves and ensuring a small bond line of said epoxy between said grooves and sides of said first connector half.

* * * * *